No. 853,000. PATENTED MAY 7, 1907.
F. A. BROWNELL.
PHOTOGRAPHIC SHUTTER.
APPLICATION FILED OCT. 21, 1905.

UNITED STATES PATENT OFFICE.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

PHOTOGRAPHIC SHUTTER.

No. 853,000.　　　Specification of Letters Patent.　　　Patented May 7, 1907.

Application filed October 21, 1905. Serial No. 283,718.

*To all whom it may concern:*

Be it known that I, FRANK A. BROWNELL, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to improvements in photographic shutters, and the purpose of the invention is to provide an improved shutter of that type adapted to making the usual "time", "bulb" and "automatically timed" or "instantaneous" exposures, and is also equipped with an improved device for holding the shutter blades in open position for focusing purposes, the device being reliable in its operation of making the several exposures and so simplified in construction that its parts may be cheaply made and readily assembled.

To these and other ends the invention consists in certain improvements and combinations and arrangements of parts, all as will be hereinafter more fully described, the novel features being set forth particularly in the claims hereunto annexed.

In the drawing.

The same reference numerals in the several views designate like parts.

The invention is capable of being applied to the various forms of photographic shutters, the present embodiment thereof comprising a hollow annular casing formed of a body portion 1 and a removable cover or front plate 2, the latter being usually provided with a sleeve 3 to receive the front lens while the body portion of the casing has a flange 4 for the rear lens element, an intermediate plate or septum 5 being arranged within the casing for sustaining parts of the shutter mechanism. This septum is provided with a central aperture alining with the optical axis of the lenses and in its rear is mounted an adjustable iris diaphragm $5^a$ which may be of any desired form and provided with a rotatable adjusting ring 6 having an arm 7 thereon arranged to coöperate with a projection 8 on a setting ring 9, the latter being preferably arranged on the front of the shutter casing. Within the casing is also mounted a suitable shutter embodying in the present instance a pair of blades 10 and 11 pivoted to swing about the pivots 12 and 13 respectively, a link 14 serving to connect the blades for simultaneous operation, a pin 15 projecting laterally from one of the blades for a purpose to be hereinafter described. On the casing at 16 is pivoted a lever 17 having a projection 18 thereon extending through a slot in the casing and coöperating with a part of one of the blades near its pivot so that when the said lever is operated in one direction it will operate to open the shutter blades and hold them open, while when operated in the opposite direction it will allow the blades to close, but the blades may be operated independently of the said lever by reason of the loose connection between them, the spring 19 normally operating to close the blades.

Figure 9:
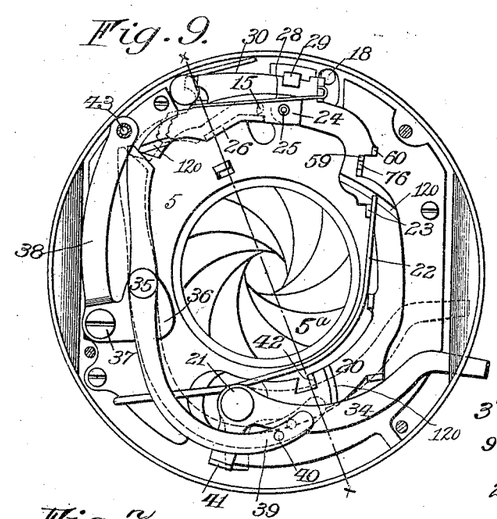
Fig. 9 shows the retarding device coöperating with the master member for automatically timing the exposure.
Figure 10:
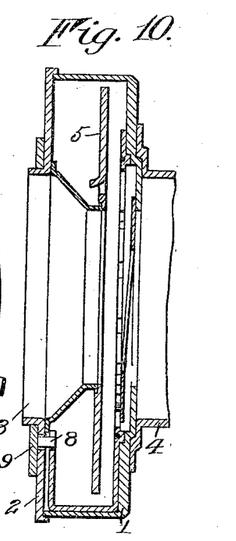
Fig. 10 represents a section through the shutter casing, taken on the line x—x of Fig. 9.

In front of the septum is arranged a master member 20 pivoted at 21 and provided with a spring 22 encircling the pivot and engaging a projection 23 to move the master member toward the left. (See Fig. 13.) This master member is curved to clear the aperture in the septum, and is provided on its free end with a pawl 24 which is pivoted at 25 and provided with a flange or guide 26 arranged at an incline to the path of motion of the master member, and has a stop 27 arranged to coöperate with the upper edge of the master member to limit the motion of the pawl in one direction, a spring 28 on the master member operating on the pawl to move the stop 27 thereon in engagement with the master member. Obviously when the master member is moved to the right, the projection 15 on the shutter blades engaging the outer side of the guide 26 on the pawl will cause the latter to lift in passing until the end of the guide is reached when the pawl will drop to a position with the guide below the projection and the stop 27 against the master member, and as the latter is moved to the left by its spring 22 the projection 15 will follow the inclined guide 26, thus lifting the projection and consequently operating the shutter blades into open position, (see Fig. 9), and the blades will be held in open position until the projection reaches the end of the guide, at which time it will be released, permitting the blades to return to normally closed position under the action of spring 19.

The master member is guided in its motions by the ribs which are formed by concentric offset portions 120 of the master member, resting against the forward surface of the septum, and by the overhanging lug 29 which coöperates with the concentric portion 30 of the master member, and the free end of the latter is arranged to coöperate with one end of a lever 31 of a retarding device, the latter comprising in the present instance a cylinder 32 attached to the casing having an air-tight plunger 33 operating therein, an arm 34 centered on the pivot 21 having a portion engaging the movable plunger to operate it within its cylinder. The lever 31 is intermediately pivoted at 35 to the bell-crank lever 36, the latter being pivoted to the casing at 37 and provided with an adjusting arm 38. One end of the lever 31 as before stated, is provided with an incline to coöperate with the master member while the opposite end thereof is provided with a curved portion 39 having a projection 40 thereon arranged to engage the lever 34, an upturned finger 41 being preferably provided on the arm 34 to engage the said curved portion and thereby retain the projection 40 in coöperative relation with arm 34, a lug 42 on the master member serving to retract the arm 34 and the plunger when the master member is retracted.

Figures 13, 14, 15, 16:
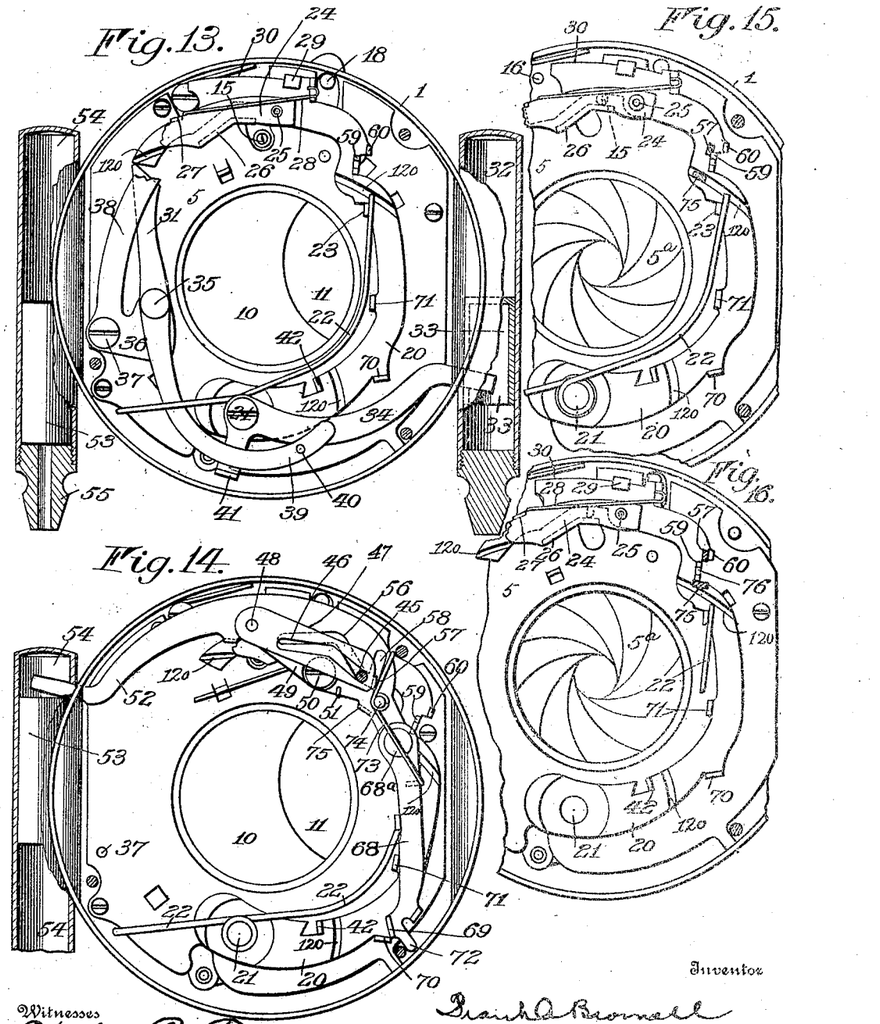
Fig. 13 shows the retarding device arranged for "time" exposures.
Fig. 14 shows the setting device arranged for the "time exposure"
Figs. 15 and 16 show the different relations of the movable stop and master member corresponding with the successive operations of the operating member.

The free end of the adjusting arm 38 is pivoted by the hollow pivot 43 to a link 44, the free end of the latter in turn being provided with a pin 45, (see Fig. 5) and this pin is arranged to operate in the cam slot 46 of an arm 47, the latter being pivoted at 48 to the operating lever 49 which is pivoted at 50 to the shutter casing, a spring 51 encircling the pivot 50 and bearing on the operating lever or member to normally lower the arm 52 thereof into an opposite position from that shown in Fig. 14, and in turn this arm 52 coöperates with a suitable motor embodying in the present instance a plunger 53 fitted to operate by fluid pressure within the cylinder 54 attached to the casing, a nipple 55 being provided at the lower end of the cylinder for the attachment of the usual bulb tube. The operating member is provided with a cam slot 56 into which the pin 45 also projects, so that reciprocatory motion of the link 44 and the pin 45 will produce a relatively transverse motion of the arm 47 on the operating member, causing a stop 57 on the latter to operate within the transverse slot 58 in the operating member. This movable stop 57 is arranged to coöperate with the projections 59 and 60 of the master member, according to the relative position occupied by the said stop within the slot 58, the projections 59 and 60 moving in paths arranged transversely to the path of the movable stop.

The projection 45 is adjusted by the link 61 having a pin 62 resting in the hollow pivot 43 of link 44, the other end of the link 61 being pivoted at 63 to an arm 64 on the exposure setting lever 65, and this lever has a pointer 66 thereon adapted to coöperate with a scale 67 on the face of the shutter casing having the marks "T," "B," "100," "25," "5," "2" and "1" thereon corresponding respectively to "time," "bulb" and the automatic exposures of one-hundredth, one-twenty-fifth, one-fifth, one-half of a second, and one second duration.

On the operating member at 68ª is pivoted a latch 68 having a heel 69 thereon arranged to engage behind a projection 70 on the master member to retract the latter, a knock-off lug 71 being provided on the master member for disengaging the heel 69 and projection 70 when the latch and master member have moved together to a given point, a toe 7 being preferably provided on the latch for holding the heel in coöperative position before engaging its corresponding projection. A spring 73 encircling the pin 74 and having an arm engaging the latch serves to retain the heel 69 of the latter yielding in coöperative relation with the projection 70 of the master member, so that when the operating member is operated in one direction, the heel will coöperate with the projection 70 of the master member to retract the latter until the knock-off projection 71 strikes the latch to disengage the projection 70 and the latch, and thus permit the master member to return to normal position, releasing of the operating member permitting the latch to ratchet past the projection 70 without operating the master member, the toe 72 resting against the said projection to hold the heel in coöperative relation therewith.

A limiting projection 75 is preferably provided on the operating member to engage the projection 59 on the master member and act as a stop for the operating member when actuated in making time exposures, a recess 76 being provided in the projection 59 to permit the passage of the limiting projection as the operating and master members are operated from normal into actuated positions.

Manual operation of the shutter mechanism may be effected through a pivoted finger piece 77 arranged on the exterior of the shutter casing and having a projection 78 extending through a slot in the casing and resting against one arm of a lever 79 the latter being pivoted to the casing at 80 and bearing at its opposite end against the pin 74.

The retard and motor cylinders may be secured to the shutter casing in any way desired, but it has been found advantageous to secure each of them by providing the casing with a recess 81 corresponding in shape to the exterior configuration of the cylinder to form a seat for it, and fixed in the wall of this seat is a stud or projection 82 with which an aperture or recess in the cylinder coöperates when the latter is applied to the seat, and when the cylinder is in proper position, the bracket 83 having a portion embracing the cylinder is clamped to the casing by the screws 84, thereby firmly securing the cylinder within its seat in the casing.

Figure 1:
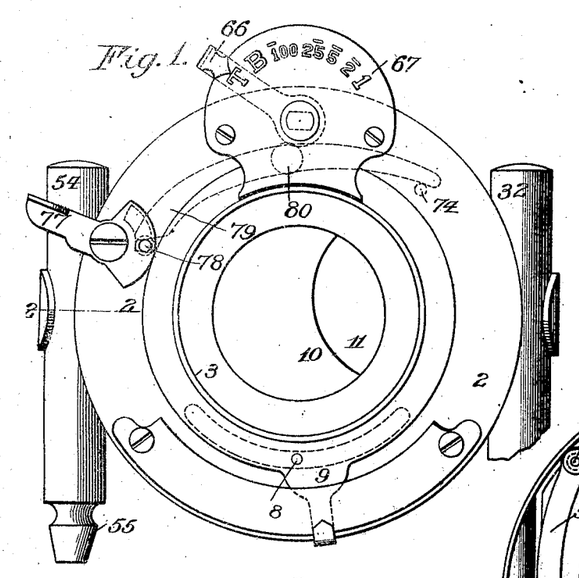
Figure 1 is a front elevation of a photographic shutter constructed in accordance with my invention.
Figure 2:
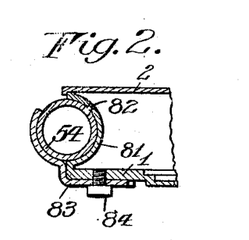
Fig. 2 represents a section through the cylinder of the operating motor, taken on the line 2—2 of Fig. 1.
Figure 3:
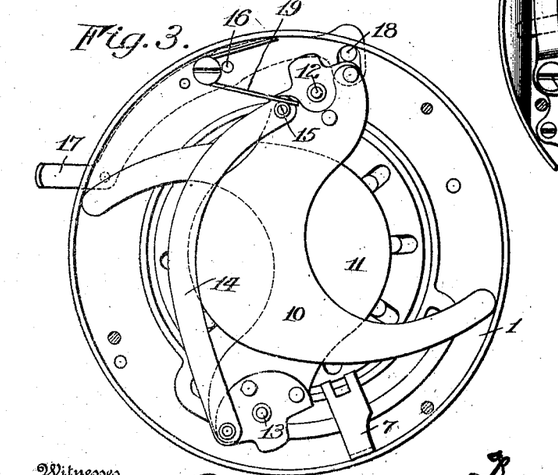
Fig. 3 is a view of the shutter with the septum and other parts removed to show the shutter blades and their operating parts, and also the device for holding the blades open during the focusing operation.
Figure 4:
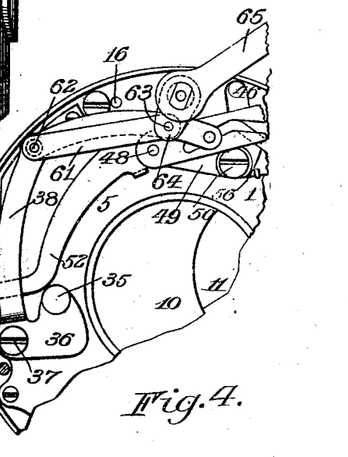
Fig. 4 shows the setting device for controlling the exposures made by the shutter.
Figures 5, 6, 11, 12:
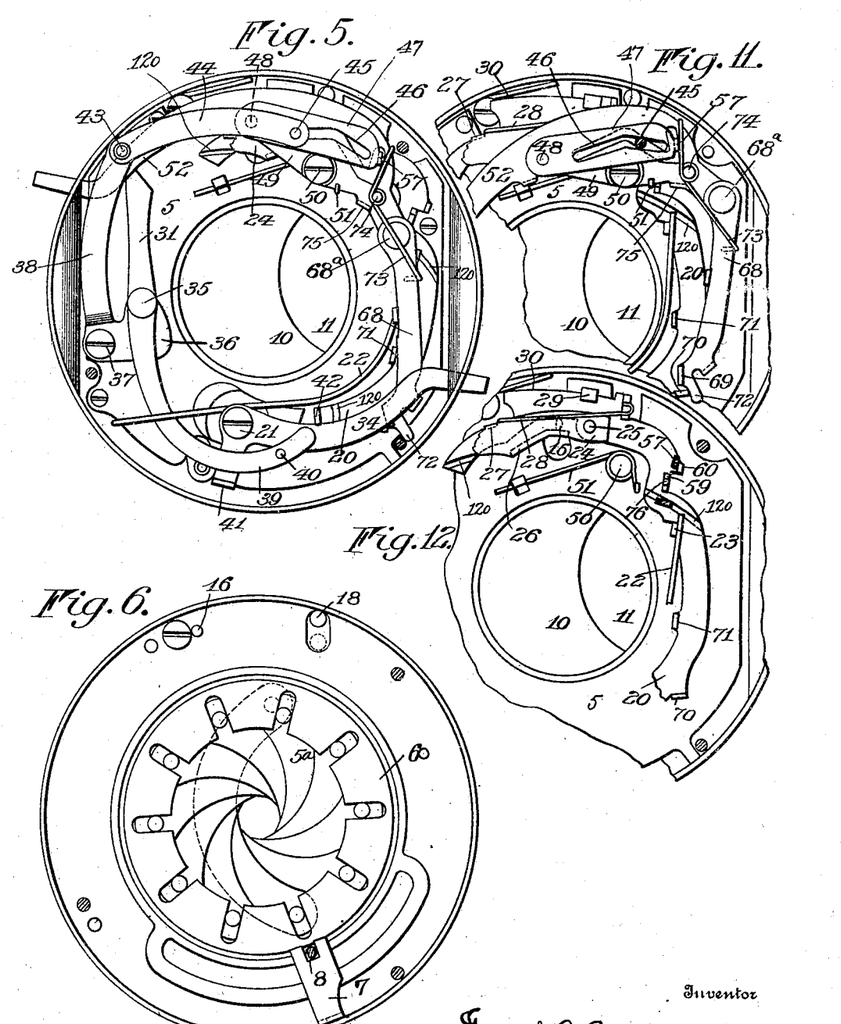
Fig. 5 shows the shutter mechanism set for "automatically timed" exposures with the master member about to be released.
Fig. 6 is a view of the shutter casing with the septum removed showing the adjustable diaphragm.
Fig. 11 is a view showing the mechanism set for "bulb" exposures.
Fig. 12 shows the movable stop coöperating with the master member for making "bulb" exposures.
Figure 7:
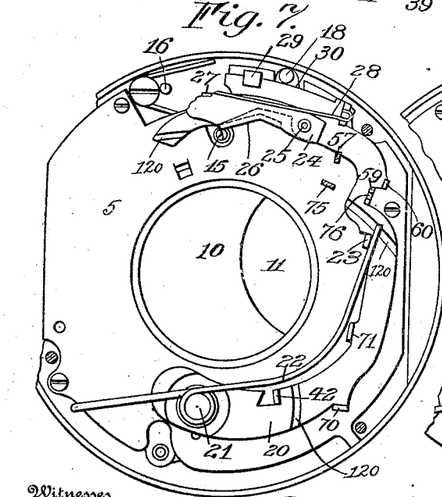
Figs. 7 and 8 show the shutter mechanism with the operating parts removed, the master member being almost fully retracted in Fig. 7, while in Fig. 8 it is shown as partially returned to normal position.
Figure 8:
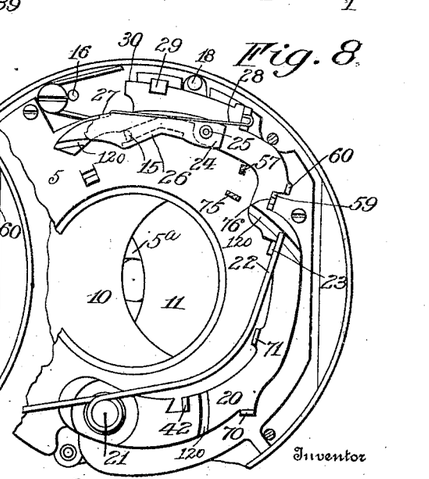

*Instantaneous exposures* may be obtained with a shutter constructed in accordance with my invention by setting the lever 65 with its pointer registering with the mark "100" on the scale, for by referring to Fig. 11 of the drawing, the link 44 at this adjustment will be drawn back so that the pin 45 thereon resting in the cams 46 and 56 respectively of the arm 47 and operating member will move the stop 57 into the upper part of slot 58 and thus clear both of the projections 59 and 60 on the master member. Adjustment of arm 38 to an intermediate position, Fig. 13, will cause the upper end of lever 31 which operates the retard device to be lowered and thus clear the corresponding end of the master member, permitting the latter to complete its motion without encountering the retard mechanism. With the parts adjusted in this way, the operating member 49 is rocked into the position shown in Fig. 14, either by means of the motor or the finger piece 77, the heel 69 of the latch on the operating member coöperating with the projection 70 of the master member to retract the latter until the pawl 24 thereon passes the projection 15 connected to shutter blades, causing the said projection to traverse the upper side of the inclined guide 26 and thus operating to open the blades. (See Figs. 7 and 8). Immediately after the pawl drops behind the projection 15, the projection 71 of the master member engaging behind the latch 68 will cause the heel 69 thereon to disengage from the projection 70 of the master member, permitting the latter to return to normal position under action of its spring 22, the shutter blades remaining open only while the projection 15 engages the guide 26 of the pawl. As the lever 31 is so adjusted as to clear the master member, the operation of the latter will be rapid, causing the blades to be momentarily opened and immediately closed, thus producing practically an instantaneous or "snap shot" exposure.

*Automatically timed exposures* are produced by setting the lever 65 until its pointer registers with the marks "25" "5" "2" or "1", corresponding respectively to one-twenty-fifth, one-fifth, one-half parts of a second and one second exposures, and in setting the lever 65 the arm 36 of the retarding mechanism is shifted so as to lift the lever 31 more or less into the path of the coöperating portion on the master member, the movable stop 57 remaining substantially in the same position it occupies in making instantaneous exposures, and thus clearing both projections 59 and 60 on the master member. When the operating member is actuated with the setting lever thus adjusted, the master member will be retracted and subsequently released by the latch, but in moving toward actuated position the projection 42 on the master member will engage the arm 34 depressing the latter and moving the retarding device or plunger into set position, or a position preparatory to the return stroke which determines the length of the exposure, and before completing its return motion and while the shutter blades are held in open position by the coöperative relation of the projection 15 and guide 26, the master member will come into contact with the inclined portion of lever 31, causing the latter to be tilted about its pivot 35, bringing the projection 40 thereon against the arm 34 and swinging the latter about its pivot to operate the plunger 33 within its cylinder. The duration of the exposure is automatically timed according to the travel of the plunger within the cylinder, and the stroke of the plunger is adjusted by shifting the lever 31 so that more or less of the incline thereon is in the path of the master member, for in this way, the end of the master member will engage the lever 31 sooner or later according to what point on the incline it engages.

*Bulb exposures* are obtained by setting the lever 56 until its pointer registers with the mark "B" on the dial, for this will operate the link 44 to bring the movable stop 57 into the path of projection 60 on the master member while the arm 38 will shift the inclined portion of lever 31 out of the path of the master member, thus throwing the retarding device out of operation. When the operating member is actuated with the parts adjusted in this way, the latch thereon will retract the master member and subsequently release it, permitting the master member to return sufficiently to enable the pawl 24 thereon to operate the projection 15 to open the shutter blades. However, the return motion of the master member will be arrested while the blades are open by the engagement of the projection 60 thereon with the movable stop 57 on the operating member, and when the latter is released, it will move toward normal position causing the movable stop 57 to disengage from the projection 60 and thus permit the master member to complete its return motion, the shutter blades being thus held open only as long as the operating member is held in operated position.

*Time exposures* are obtained by adjusting the pointer of the setting lever to register with the mark "T" on the scale, for this will operate the link 44 and its pin 45 until the movable stop 57 rests in the path of projection 59 on the master member, while the arm 38 occupies such a position that the lever 31 is clear of the master member and therefore the retard device will be held out of operative position, (see Figs. 13 and 14). Operation of the operating member with the parts adjusted in this way will cause the latch to retract the master member and then release it, the latter operating on the projection 15 as it returns toward normal position to open the shutter blades. However, as the movable stop 57 rests in the path of projection 59 on the master member, the return motion of the latter will be arrested while the shutter blades are still open, and when the operating member is released, it will move toward normal position until the projection 75 thereon engages at the side of projection 59 on the master member, the movable stop 57 moving from the projection 59 to the second projection 60, thus holding the operating member in an intermediate position with the heel 69 of the latch below the projection 70. A second operation of the operating member will cause the movable stop 57 to slip off laterally from the projection 60, permitting the master member to complete its motion and thereby close the shutter blades, the exposure being made by two successive actuations of the operating member.

During the focusing operation, the shutter blades may be opened by lifting the lever 17, the projection 18 thereon bearing on a part of one of the shutter blades 10 near its pivot to swing them into open position, the link 14 serving to connect the blades for simultaneous operation, and when the focusing has been accomplished, the lever 17 is returned to normal position, and the blades will return automatically to closed position under action of their spring 19. Thus it will be observed that the blades may be opened and held open entirely independently of and without disturbing the setting of the shutter, as is necessary with shutters of this type as heretofore constructed.

A photographic shutter embodying my invention is capable of making the various kinds of exposures including the so-called "time", "bulb" and automatically timed and instantaneous exposure, and still is composed of comparatively few parts that may be readily and cheaply turned out by machinery, and the parts thus made may be readily assembled by unskilled labor, enabling the shutter to be produced at a comparatively small cost. Moreover, by employing the latch between the operating and master members, the shutter is automatic in its operation, that is actuation of the operating member serves to both set and release the master member, thus avoiding the necessity of preliminarily setting the master member for each exposure, while by arranging the movable stop and its coöperating projections between the operating and master members, the several kinds of exposures described may be obtained in a sure and reliable way, while the improved arrangement simplifies the construction and reduces the number of parts of the shutter. By arranging the retard mechanism so that it may be entirely disengaged from the blade operating parts excepting for the automatically timed exposures insures certainty and uniformity in the operation of the shutter blades while the parts are subjected to the minimum of wear which in time would tend to alter the durations of the automatically timed exposures.

I claim as my invention:

1. In a photographic shutter, the combination with a casing inclosing a movable shutter blade, of a master member for operating the blade, an operating member for actuating the master member, and a movable stop on the operating member, having a setting device for adjusting its position relatively to a coöperating portion of the master member for varying the exposures produced by the shutter blade.

2. In a photographic shutter, the combination with the movable shutter blade, of a master member spring operated in one direction for operating the blade, an operating member for setting and releasing the master member, and a stop on one of the members and having devices for setting it to vary the exposures by controlling the operation of the master member.

3. In a photographic shutter, the combination with the movable shutter blades, of the master and operating members pivoted to move in intersecting paths, and a controlling stop adjustably mounted on one of the members and arranged to coöperate with the other for controlling the operation of the shutter blades.

4. In a photographic shutter, the combination with the movable shutter blade, of a movable master member for operating the blade, an operating member, and a controlling stop carried by the operating member and adjustable thereon in a direction transversely to the path of the master member for controlling the operation of the latter.

5. In a photographic shutter, the combination with the movable shutter blades, of a master member for operating the blades, and having limiting projections arranged thereon, and a shutter operating member having a controlling stop thereon adjustable relatively to the paths of the respective projections.

6. In a photographic shutter, the combination with the shutter casing and the movable shutter blades, of a movable master member for operating the blades having limiting projections thereon, a pivoted operating member, a stop carried by the operating member and adjustable relatively to the paths of the respective stops of the master member, a setting device arranged on the shutter casing, and devices connecting the setting device and movable stop for adjusting the latter.

7. In a photographic shutter, the combination with the shutter casing and the blades, of a movable master member for operating the blades having a projection thereon, an operating member, and a stop thereon for controlling the operation of the master member embodying a pivoted arm on the operating member having a projecting stop to coöperate with the projection of the master member, a cam slot being formed in the arm, and a pin coöperating with the operating member and operating in the cam slot of the arm for adjusting the stop relatively to the path of the projection on the master member.

8. In a photographic shutter, the combination with the shutter blade, of a movable master member for operating the blade having a pair of projections thereon, an operating member operable in a direction transversely to the motion of the master member, a controlling stop on the operating member arranged to coöperate with the projections of the master member to arrest the motion thereof in one direction, and a projection on the operating member arranged to coöperate with the master member while the controlling stop is in engagement with one of the projections thereon, for preventing motion of the operating member in one direction.

9. In a photographic shutter, the combination with a movable shutter blade, of pivoted master member spring-operated in one direction for operating the blade, and having projections thereon, an operating member for setting and releasing the master member, a controlling stop on the operating member adapted to coöperate with the projections of the master member and control the operation thereof, and a projection on the operating member arranged to coöperate with the master member when the controlling stop is in engagement with one of the projections of the master member for controlling the movement of the operating member in one direction.

10. In a photographic shutter, the combination with a movable shutter blade, of a master member for operating the blade, and an operating member for retracting the master member having a latch thereon adapted to coöperate with the master member, and a knock-off projection on the master member for disengaging the latter and the latch.

11. In a photographic shutter, the combination with a movable shutter blade, and a master member for operating the blade having engaging and knock-off projections thereon, of an operating member, and a latch pivoted thereon having a heel to coöperate with the engaging projection for retracting the master member, and a toe adjacent to the heel and serving to insure the coöperative relation of the latter and its corresponding projection, the knock-off projection being arranged to disengage the heel and its projection at a predetermined point to release the master member.

12. In a photographic shutter, the combination with a movable shutter blade having a movable operating projection, of a member movable in a direction transversely to that of said projection and having a pivoted pawl thereon to coöperate with said projection when said member is moved in one direction to operate the blade, and to pass said projection without operating it when moved in the opposite direction.

13. In a photographic shutter, the combination with a movable shutter blade, and a movable operating projection for operating it, of a member for operating the said projection, having a pawl pivoted thereon having an inclined guide to engage the projection and operate it in a direction transverse to the direction of movement of said member to move the blade when said member is operated in one direction, said pawl being pivoted to swing clear of said projection when the said member is moved in the opposite direction.

14. In a photographic shutter, the combination with a movable shutter blade, and a movable operating projection operatively connected thereto, of a pivoted master member, and a pawl pivoted on the master member and arranged to swing in the plane of movement thereof and having an inclined flange projecting laterally of the plane of movement and forming a guide to coöperate with the blade operating projection.

15. In a photographic shutter, the combination with a movable shutter blade, and a movable operating projection operatively connected thereto, of a movable master member, a pivoted pawl on said member arranged to operate in the plane of movement of the master member, a flange on the pawl projecting laterally of the plane of movement of the master member and adapted to serve as a guide to coöperate with the blade operating projection, a spring for operating the pawl in one direction, and a limiting projection on the pawl arranged to coöperate with the master member as a stop for the pawl when in engagement with the blade operating projection.

16. In a photographic shutter, the combination with a movable shutter blade, of a master member for operating the blade, a retarding device, a pivoted arm operatively connected to the retarding device and arranged to be engaged by a portion on the master member for setting the retarding device preparatory to an exposure, and means for adjusting said arm into and out of the path of the master member for controlling the operation of the retarding device relatively to the movements of the master member.

17. In a photographic shutter, the combination with the movable shutter blade, of a pivoted spring actuated master member for operating the blade, a retarding device, an arm operatively connected to the retarding device and arranged to be engaged by a portion of the master member when the latter is moving toward actuated position to set the retarding device preparatory to the opening of the shutter blade, a lever arranged to be operated by the master member during movement of the latter toward normal position, and coöperating with said arm for returning the retarding device to normal position during the exposure, and means for moving the lever into and out of coöperative relation with the master member.

18. In a photographic shutter, the combination with a movable shutter blade, and a spring-actuated master member for operating the blade having a projection thereon, of a retarding device, an arm coöperating therewith and with the projection of the master member, and an adjustable lever coöperating with said arm having an inclined portion thereon adapted to be engaged by the master member.

19. In a photographic shutter, the combination with a movable shutter blade, and a master member for operating the blade, of a retarding device, an arm operated by the master member for setting the retarding device, a lever coöperating with the said arm and having a portion adapted to coöperate with the master member during the return movement of the retarding device, and means for shifting the said lever transversely relatively to the path of the master member.

20. In a photographic shutter, the combination with a movable shutter blade, and a movable master member for operating it, of a retarding device, an arm for operating it, means for setting the said device preparatory to an exposure a lever for operating the said arm to return the retarding device to normal position having a portion thereon inclined relatively to the direction of movement of the master member, and a device for shifting the inclined portion of the lever across the path of the master member to vary the retarding action on the movement of the master member.

21. In a photographic shutter, the combination with a movable shutter blade, and a pivoted master member for operating it and an exposure controlling stop, of a retarding device, an arm for operating it, a lever arranged to coöperate with the said arm and having a portion adapted to coöperate with the master member, a pivoted bell crank having one arm provided with a pivot for said lever, and an adjusting arm for operating said crank to shift the pivot of the said lever and a setting lever having a link connection with both the stop and said adjusting arm.

22. In a photographic shutter, the combination with the casing, the movable shutter blades, and a master member for operating the blades, of a retarding device, an arm for operating the latter, means for setting said device preparatory to an exposure, a lever coöperating at one end with said arm and having an inclined portion at its opposite end adapted to coöperate with the master member to return the retarding device to normal position, a bell-crank pivoted to a part on the casing having an arm providing a pivot for said lever, and an adjusting arm on the crank for adjusting the latter to shift the inclined portion of the lever relatively to the master member for varying the proportion of the latter's movement during which the retarding device is operated.

23. In a photographic shutter, the combination with a movable shutter blade, a master member for operating it, having projections thereon, a movable stop adapted to coöperate with said projections for varying the kinds of exposures, and a retarding device having a part movable into and out of coöperative relation with the master member, of an arm for adjusting the retarding device, a device for adjusting the movable stop and a link connecting the stop adjusting device and the adjusting arm for the retarding device for simultaneous operation.

24. In a photographic shutter, the combination with a movable shutter blade, a master member for operating the blade having projections thereon, a movable stop adapted to coöperate with the said projections for varying the kinds of exposures, and a cam for adjusting the movable stop, of a retarding device having a part arranged to move into and out of coöperative relation with the master member, an arm for adjusting the said part, and a link having a part thereon for operating the cam for the movable stop and connected to the adjusting arm for the retarding device.

25. In a photographic shutter, the combination with a movable blade, a master member for operating it having projections thereon, an operating member for setting the master member having a slot therein, a slotted arm movable on the operating member having a stop thereon adapted to coöperate with the projections of the master member to control the movement thereof, and a pin operating in the slots of the operating member and the arm thereon for adjusting the position of the movable stop relatively to the path of the projections on the master member, of a retarding device having a part arranged to move into and out of coöperative relation with the master member, an arm for adjusting the said part, and a link connecting the retard controlling arm and the pin of the said slots for simultaneous operation.

26. In a photographic shutter, the combination with a casing, movable shutter blades therein, a master member for operating the blades having projections thereon, and a movable stop adapted to coöperate with said projections to control the movement of the master member, of a retarding device having a part movable into and out of coöperative relation with the master member, a pivoted arm for adjusting the said part, a link having a part for operating the movable stop and a hollow pivot connecting it to the said arm, a setting lever on a portion of the casing, and a second link connected to the setting lever and having a pin coöperating with said hollow pivot.

FRANK A. BROWNELL.

Witnesses:
F. F. CHURCH,
E. B. ROBY.